(12) United States Patent
Kim

(10) Patent No.: US 7,295,264 B2
(45) Date of Patent: Nov. 13, 2007

(54) DISPLAY APPARATUS AND METHOD FOR SELECTIVELY DISPLAYING TWO-DIMENSIONAL IMAGE AND THREE-DIMENSIONAL IMAGE

(75) Inventor: Sung-sik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 10/719,019

(22) Filed: Nov. 24, 2003

(65) Prior Publication Data
US 2004/0150767 A1    Aug. 5, 2004

(30) Foreign Application Priority Data
Nov. 23, 2002    (KR) .............. 10-2002-0073324

(51) Int. Cl.
*G02F 1/1347* (2006.01)
(52) U.S. Cl. .......................... 349/74; 349/15
(58) Field of Classification Search ........... 349/74; 359/15
See application file for complete search history.

(56) References Cited

U.S. PATENT DOCUMENTS

| 5,315,377 A | * | 5/1994 | Isono et al. | 348/51 |
|---|---|---|---|---|
| 6,040,807 A | * | 3/2000 | Hamagishi et al. | 345/6 |
| 6,525,847 B2 | * | 2/2003 | Popovich et al. | 359/15 |
| 2002/0118452 A1 | * | 8/2002 | Taniguchi et al. | 359/463 |
| 2003/0151821 A1 | * | 8/2003 | Favalora et al. | 359/619 |

FOREIGN PATENT DOCUMENTS

| EP | 540 137 A1 | 5/1993 |
|---|---|---|
| KR | 0274625 B1 | 9/2000 |

* cited by examiner

*Primary Examiner*—Andrew Schechter
*Assistant Examiner*—Lucy Chien
(74) *Attorney, Agent, or Firm*—Sughrue Mion Pllc.

(57) ABSTRACT

A display apparatus and method for selectively displaying a two-dimensional image and a three-dimensional image are provided. The display apparatus includes a flat panel display device which generates a two-dimensional image when two-dimensional image display is requested and generates viewpoint images having parallax when three-dimensional image display is requested; and a switching panel which is disposed in front of the flat panel display device to be separated from the flat panel display device by a predetermined distance and is controlled according to a type of image generated by the flat panel display device so that two-dimensional images and three-dimensional images can be displayed.

15 Claims, 7 Drawing Sheets

DISPLAY APPARATUS AND METHOD FOR SELECTIVELY DISPLAYING TWO-DIMENSIONAL IMAGE AND THREE-DIMENSIONAL IMAGE

CROSS-REFERENCE TO RELATED APPLICATIONS

This application claims the priority of Korean Patent Application No. 10-2002-0073324, filed on Nov. 23, 2002, in the Korean Intellectual Property Office, the disclosure of which is incorporated herein by reference.

BACKGROUND OF THE INVENTION

1. Field of the Invention

The present invention relates to a display apparatus and method, and more particularly, to a display apparatus and method for selectively displaying a two-dimensional image and a three-dimensional image.

2. Description of the Related Art

With rapid changes in human life, such as an increase in demand for jobs using the Internet, realistic communication, virtual reality, and an endoscope, a need of integrating a computer, broadcasting, and communication into a single medium for primarily visualizing multimedia technology, and visualization of the results of diagnosis and measurement in three-dimensional images, demand for a display apparatus which can display an image in three dimensions is increasing.

Three-dimensional display technology is required in the fields of three-dimensional display used as a new medium of advertisement, three-dimensional multimedia image display terminals used at home, image display terminals for simulators and educational training, image display terminals for visualizing various types of precision measurements and diagnoses, medical three-dimensional image display terminals, image display terminals for monitoring and controlling, three-dimensional image monitors for video conferencing and advertisement, three-dimensional televisions for broadcasting, image display terminals and/or various types of parts used for constructing special environments for education/pleasure, image apparatuses for three-dimensional games, and head-up display for airplanes and automobiles.

Technology of designing and manufacturing a structure of an optical plate such as a lenticular plate or a microlens plate to form a visual field and driving control technology for reproducing a pixel pattern corresponding to the visual field on a display device are required to implement a general three-dimensional display apparatus. Multiple viewpoint display is a technology of displaying a three-dimensional image using binocular parallax by displaying different view images. A lenticular method and an Integral Photography (IP) method are multiple viewpoint display methods.

FIG. 1 shows a pixel structure and a disposition of a lenticule in a 7-viewpoint three-dimensional display apparatus disclosed in WO Patent Publication No. 99/5559. It illustrates an example of a lenticular method.

Referring to FIG. 1, in the conventional 7-viewpoint three-dimensional display apparatus, a lenticular plate 1 is disposed above an array of RGB sub-pixels 3 constituting a single color pixel such that lenticules 1a slant on the array of RGB sub-pixels 3 in order to accomplish horizontal and vertical parallax.

FIG. 2 shows a microlens plate used in the IP method. In the IP method, an image is photographed via the microlens plate 5 shown in FIG. 2. The photographed image is displayed using a flat panel display such as a liquid crystal display (LCD), and the displayed image is viewed via another microlens plate having similar characteristics as the microlens plate 5 used during photographing.

In the IP method, each lens 5a of the microlens plate 5 photographs a whole image of an object viewed from its position within the microlens plate 5. Accordingly, the microlens plate 5 functions as if many cameras are arranged in two dimensions. Such function of the microlens plate 5 is disclosed by F. Okano et al. in "Applied Optics", Vol. 36, pp. 1598-1603, 1997.

However, the conventional 7-viewpoint three-dimensional display apparatus using a lenticule method and the conventional three-dimensional display apparatus using the IP method have the following problems.

In the 7-viewpoint three-dimensional display apparatus shown in FIG. 1, since it is difficult to independently and separately drive the RGB sub-pixels 3, it is difficult to display real images in real time.

In the IP method using the microlens plate 5, as shown in FIG. 2, vertical and horizontal parallaxes are simultaneously indicated and a volume image is displayed. Because a whole image of an object must be recorded on a single microlens 5a, however, development of a display device which can display the whole image of the object in an area corresponding to the diameter of the microlens 5a at a predetermined resolution is required. However, it is difficult to manufacture the microlens plate 5 having a high resolution, and a space among the microlenses 5a causes an image to be discontinuous. In addition, a border line between microlenses 5a causes distortion or deformation. As a result, a ghost phenomenon of overlapping images occurs when a three-dimensional image is reproduced.

Moreover, the conventional 7-viewpoint three-dimensional display apparatus using the lenticule method and the conventional three-dimensional display apparatus using the IP method are suitable for three-dimensional image display but have problems in displaying two-dimensional images. Accordingly, they are expensive and not suitable to the market, and thus have very low practical usability because most contents are suitable to a two-dimensional mode and contents for a three-dimensional mode are not common at present.

SUMMARY OF THE INVENTION

The present invention provides a display apparatus and method for naturally displaying three-dimensional images and selectively displaying normal two-dimensional images and three-dimensional images having a depth according to a type of content.

According to an exemplary aspect of the present invention, there is provided a display apparatus for selectively displaying a two-dimensional image and a three-dimensional image. The display apparatus includes a flat panel display device which generates a two-dimensional image when two-dimensional image display is requested and generates a plurality of viewpoint images having parallax when three-dimensional image display is requested; and a switching panel which is disposed in front of the flat panel display device to be separated from the flat panel display device by a predetermined distance and is controlled according to a type of image generated by the flat panel display device so that two-dimensional images and three-dimensional images can be displayed.

Preferably, but not necessarily, the switching panel is formed to transmit light as it is when a two-dimensional image is generated by the flat panel display device and has a structure corresponding to pixel information of the flat panel display device when viewpoint images for forming a three-dimensional image are generated by the flat panel display device.

Preferably, but not necessarily, each pixel of the switching panel comprises a valid image display region which transmits light corresponding to the viewpoint images during the three-dimensional image display; and a selective blocking region which is surrounded by the valid image display region and selectively transmits and blocks light according to on/off control.

Preferably, but not necessarily, a size of the valid image display region can be adjusted.

The switching panel may be a liquid crystal display which is designed to selectively turn on and off light according to a control signal.

Preferably, but not necessarily, the flat panel display device is a liquid crystal display, a plasma display panel, a field emission device, or an organic electroluminescence panel.

Preferably, but not necessarily, the flat panel display device generates a plurality of viewpoint images arranged in an n×n matrix in each pixel when a three-dimensional image is generated.

Preferably, at least one of following formulae is satisfied:

$$p_i = p\left(1 - \frac{d}{V_D}\right) \text{ and}$$

$$Ep_i = V_W \cdot \frac{d}{V_D},$$

where "p" denotes a pixel pitch of the flat panel display device, $p_i$ denotes a pixel pitch of the switching panel, $V_D$ denotes a watching distance, "d" denotes a distance between the flat panel display device and the switching panel, $Ep_i$ denotes a width of the valid image display region transmitting light on the switching panel during three-dimensional image display, and $V_W$ denotes a width of a visual field.

Preferably, but not necessarily, the width $Ep_i$ of the valid image display region transmitting light on the switching panel and the pixel pitch $p_i$ of the switching panel satisfy a relationship expressed by $Ep_i \leq p_i$.

Preferably, but not necessarily, when a distance between adjacent visual fields of different viewpoints is denoted by $\Delta V$, an image width $\Delta Ep_i$ corresponding to the distance $\Delta V$ in the valid image display region is given by the following formula:

$$\Delta Ep_i = \Delta V \cdot \frac{d}{V_D}.$$

The display apparatus may further comprise a visual field expansion unit which expands a visual field in at least one of a vertical direction and a horizontal direction.

According to another exemplary aspect of the present invention, there is provided a method of selectively displaying a two-dimensional image and a three-dimensional image. The method comprises selecting one of two-dimensional image display and three-dimensional image display; driving a flat panel display device to generate a two-dimensional image or generate a plurality of viewpoint images having different parallaxes in each pixel so as to display a three-dimensional image so that the two-dimensional image or the three-dimensional image is displayed; and driving a switching panel according to a type of image generated by the flat panel display device such that the switching panel transmits light as it is when the two-dimensional image is generated by the flat panel display device and has a structure corresponding to pixel information of the flat panel display device when the plurality of viewpoint images are generated by the flat panel display device.

BRIEF DESCRIPTION OF THE DRAWINGS

The above and other exemplary features and advantages of the present invention will become more apparent by describing in detail illustrative, non-limiting embodiments thereof with reference to the attached drawings in which.

DETAILED DESCRIPTION OF THE INVENTION

Figure 1:
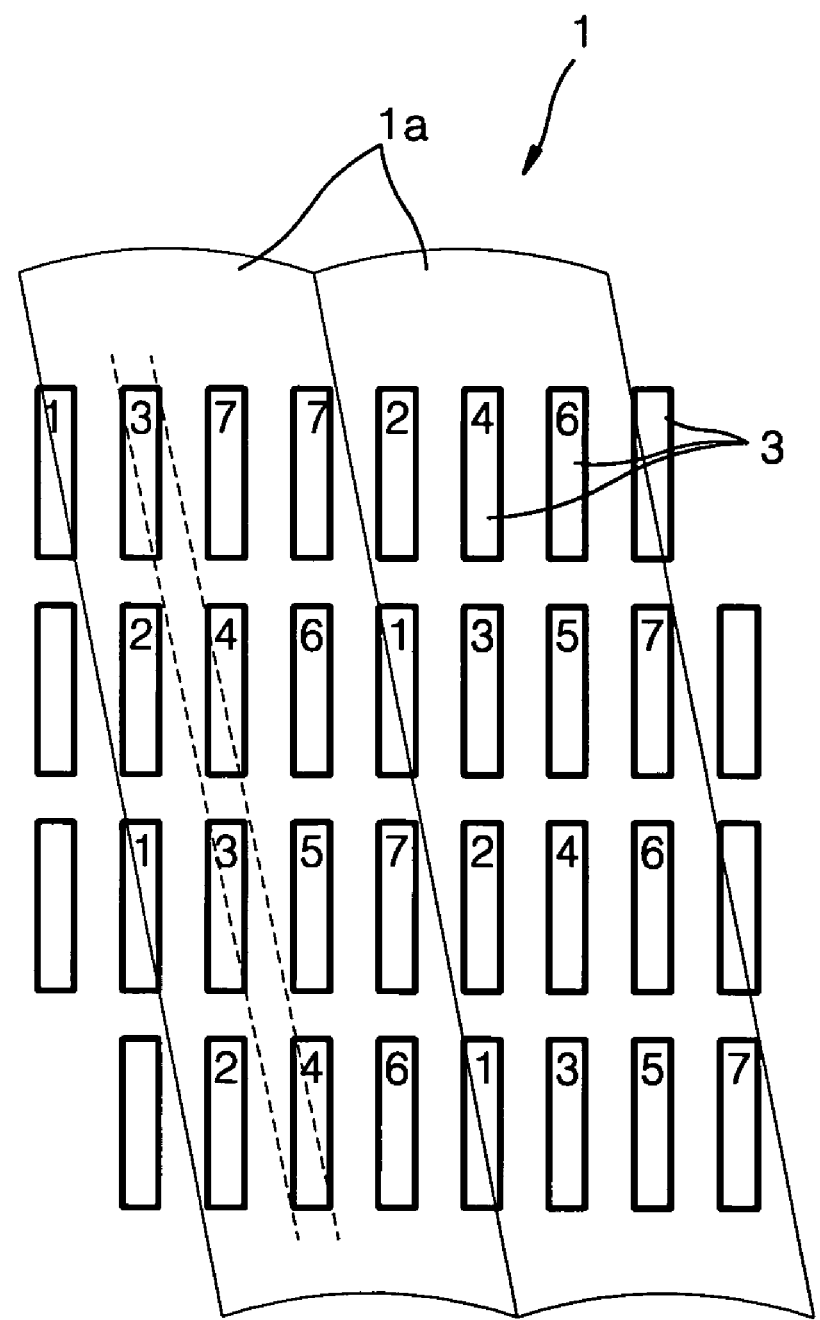
FIG. 1 shows a pixel structure and a disposition of a lenticule in a 7-viewpoint three-dimensional display apparatus disclosed in WO Patent Publication No. 99/5559, which illustrates an example of a lenticular method.
Figure 2:
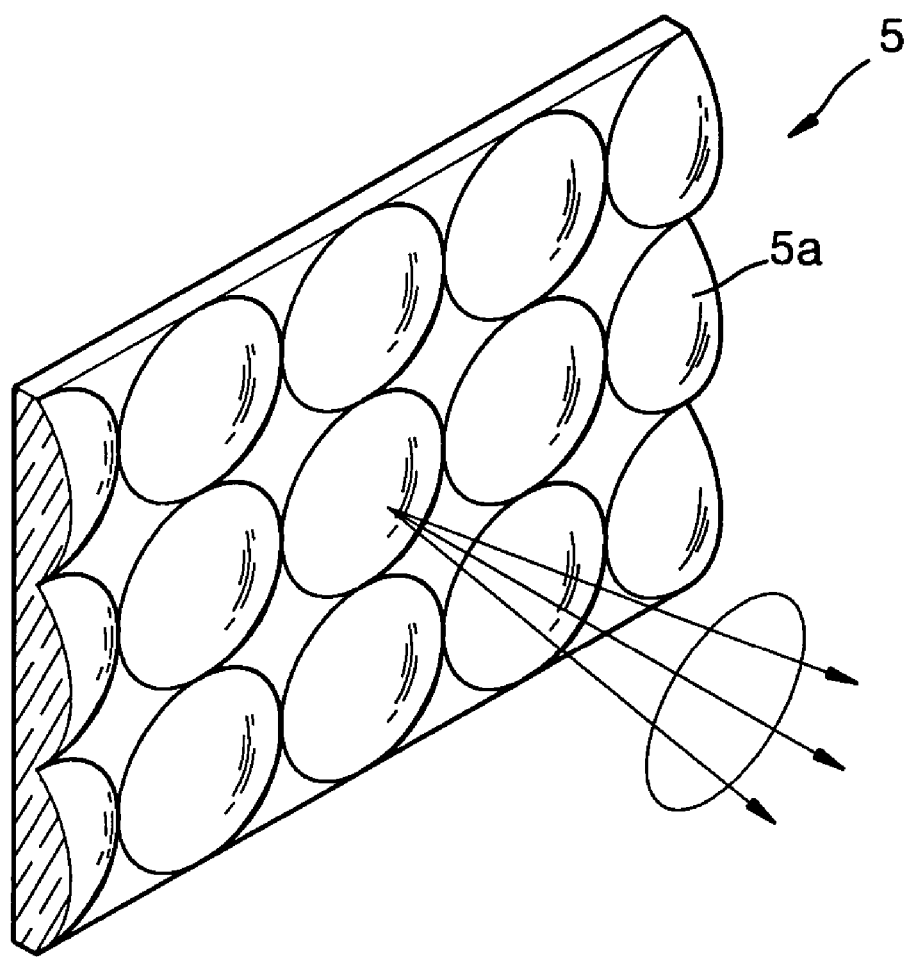
FIG. 2 is a perspective view of a microlens plate used in an Integral Photography (IP) method.
Figure 3:
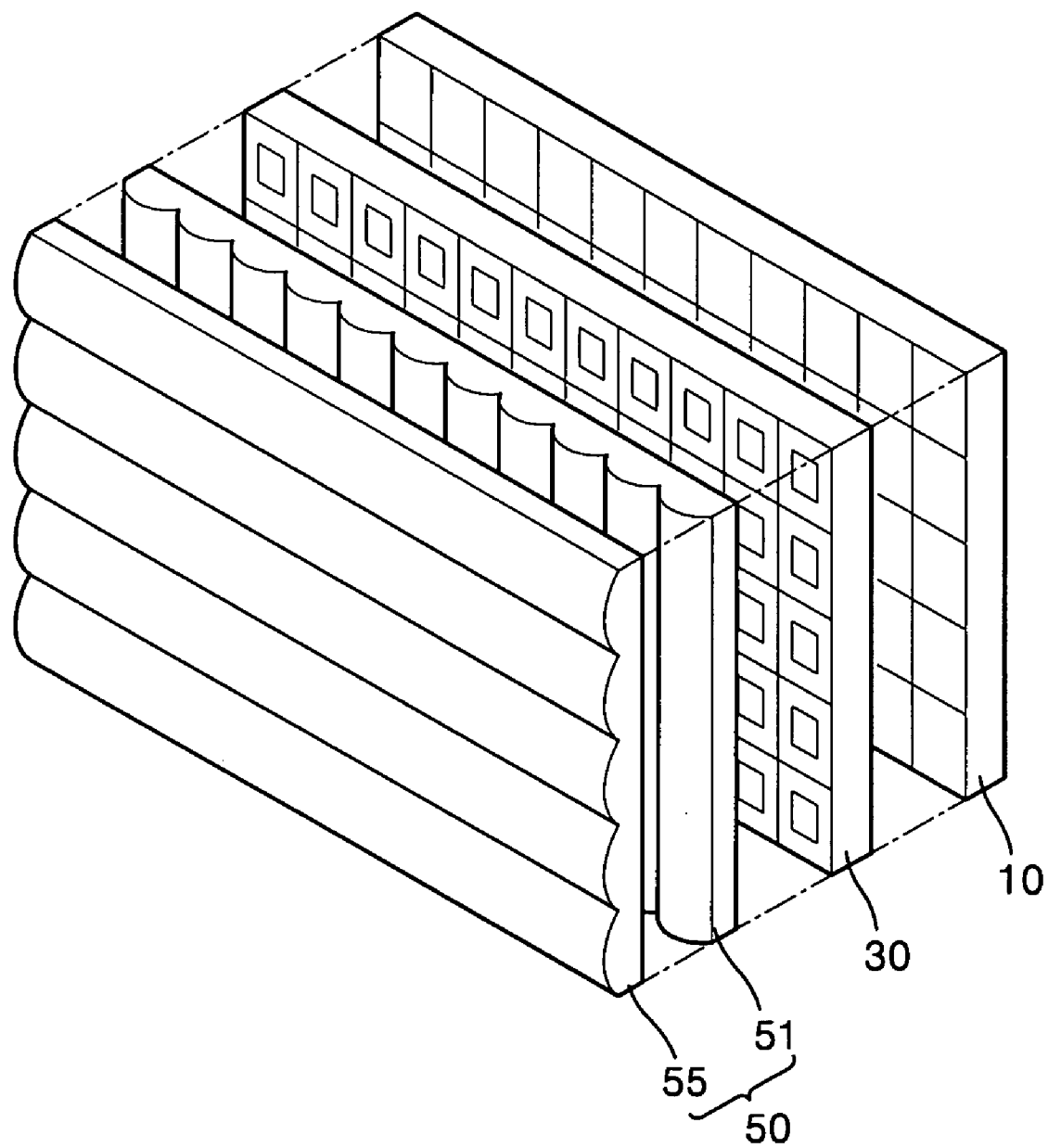
FIG. 3 is an exploded perspective view of a main structure of a display apparatus according to an embodiment of the present invention.

FIG. 3 is an exploded perspective view of a main structure of a display apparatus according to an illustrative embodiment of the present invention. Referring to FIG. 3, the display apparatus includes a flat panel display device 10 which displays an image and a switching panel 30 which is disposed in front of the flat panel display device 10 to be separated from the flat panel display device 10 by a predetermined distance. Preferably, the display apparatus also includes a visual field expansion unit 50 which expands a visual field in a vertical direction and/or a horizontal direction.

The flat panel display device 10 generates, for example, a normal two-dimensional RGB image when normal two-dimensional image display is requested and generates a plurality of viewpoint images having parallax in each pixel when three-dimensional image display is requested. Preferably, the flat panel display device 10 is implemented by a liquid crystal display (LCD), a plasma display panel (PDP), a field emission device (FED), or an organic electroluminescence (EL) panel to display RGB colors.

Figure 4:
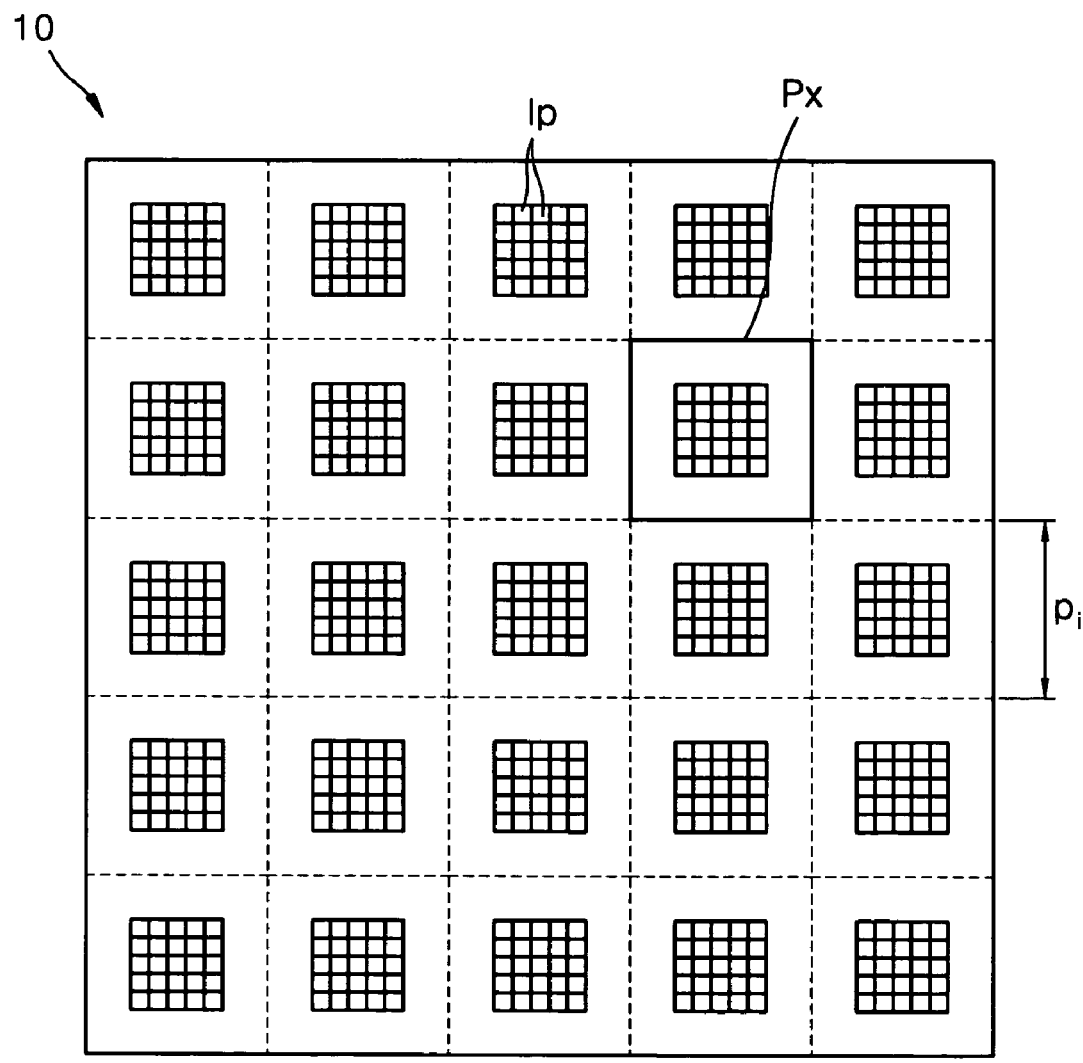
FIG. 4 is a diagram showing an example in which a flat panel display device of FIG. 3 generates 25 viewpoint images arranged in a 5×5 matrix in each pixel when three-dimensional image display is requested.

It is preferable that the flat panel display device 10 generates a plurality of viewpoint images having parallax which are arranged in an n×n matrix in each pixel Px, as shown in FIG. 4, when three-dimensional image display is requested. FIG. 4 is a diagram showing an example in which the flat panel display device 10 generates 25 viewpoint images arranged in a 5×5 matrix in each pixel Px when three-dimensional image display is requested. During three-dimensional image display, each pixel Px in the flat panel display device 10 includes a plurality of sub-pixels Ip each generating a viewpoint image. When 25 viewpoint images are generated in a 5×5 matrix in each pixel Px, as shown in FIG. 4, each pixel Px includes at least 25 sub-pixels Ip arranged in a 5×5 matrix. In FIG. 4, for clarity of the description, an area which is not used in each pixel Px when plurality of viewpoint images arranged in an n×n matrix are generated is exaggerated. In FIG. 4, a reference character Px denotes a pixel of the flat panel display device 10.

In such a structure in which multiple viewpoint images are arranged in an n×n matrix, parallax can be given in horizontal, vertical, and diagonal directions so that a viewer can enjoy three-dimensional images at any position. As a result, display of more natural three-dimensional images can be accomplished.

Figure 5:
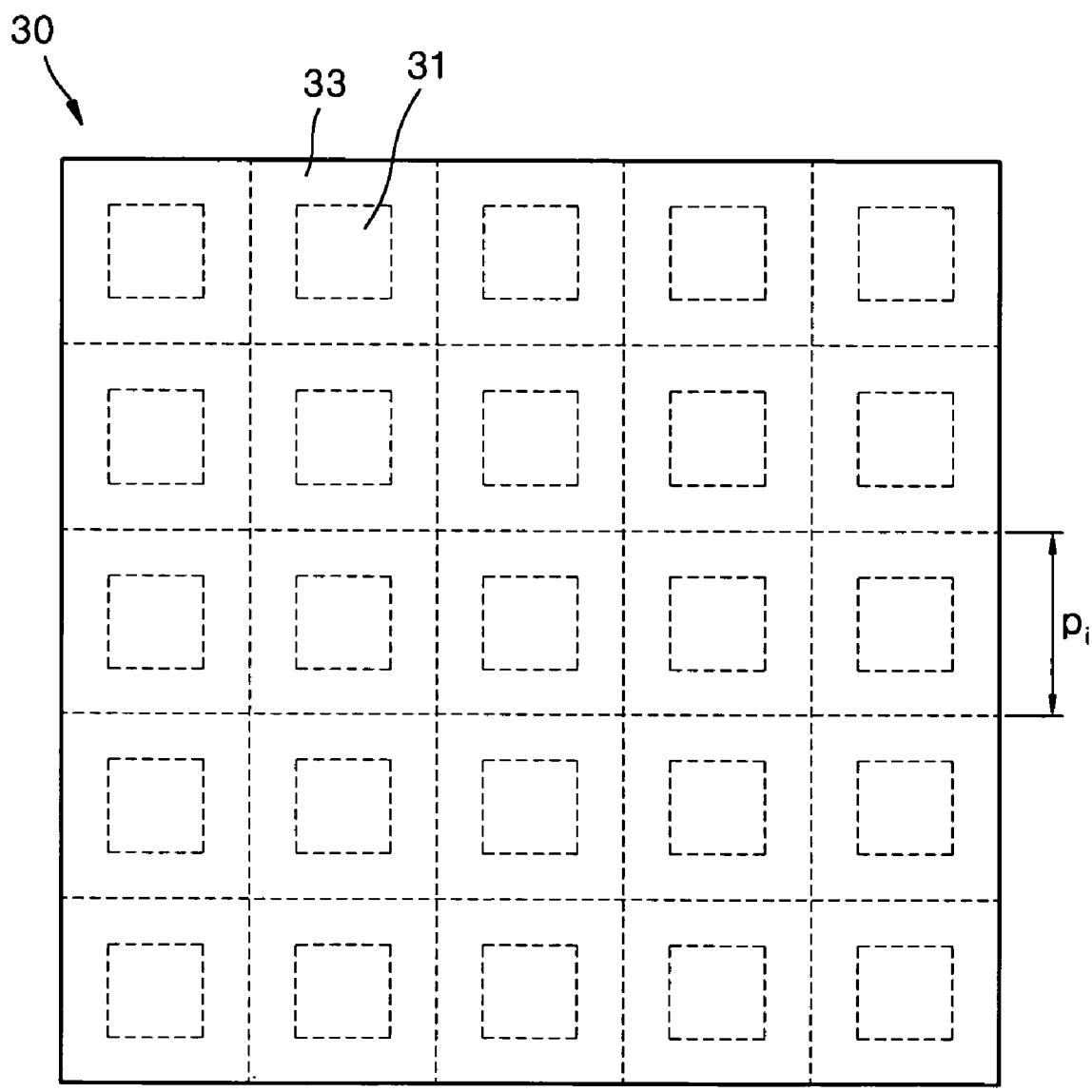
FIG. 5 is a plane view of a switching panel shown in FIG. 3.
Figure 6:
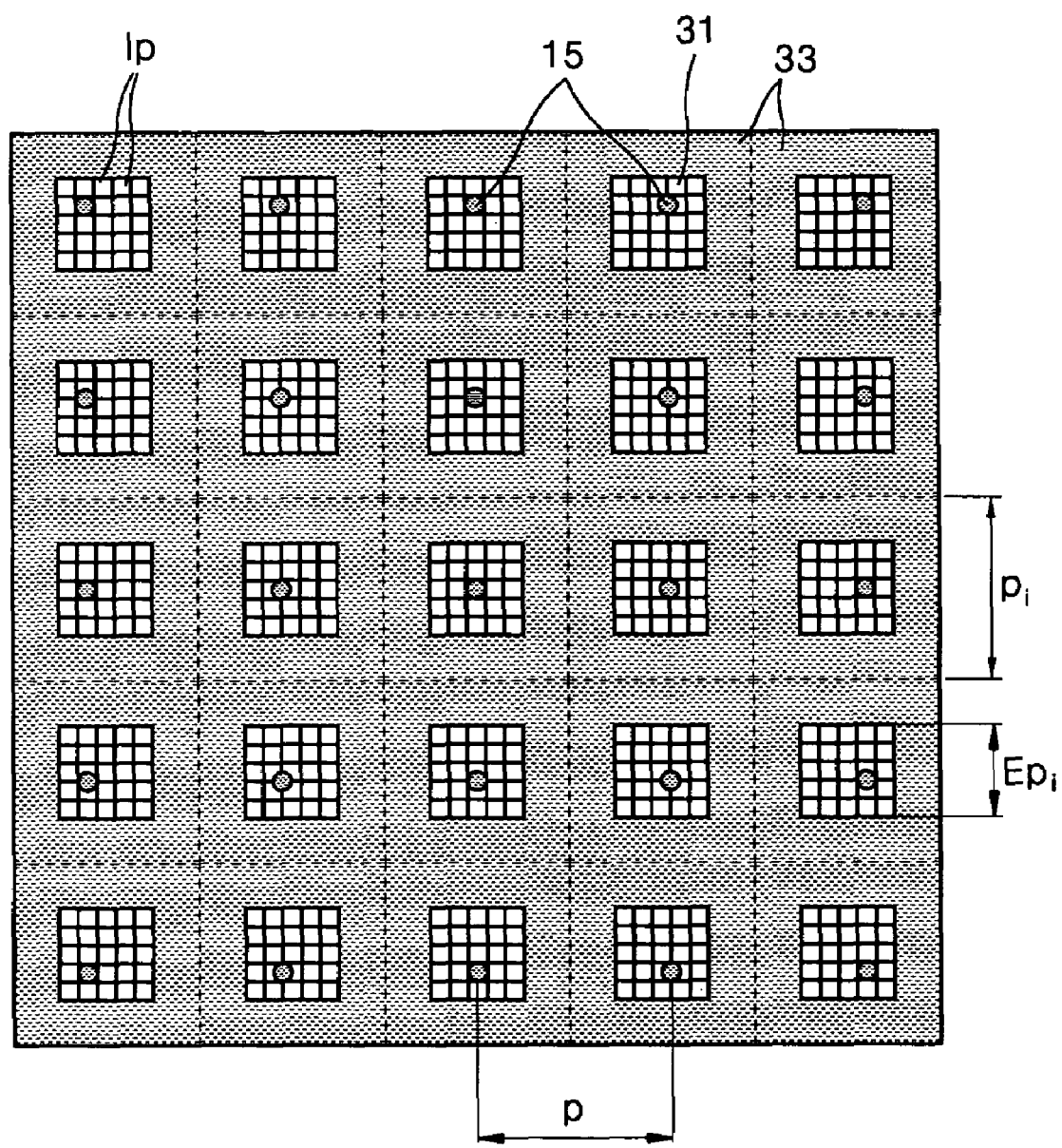
FIG. 6 is a plane view of an overlap of the flat panel display device and the switching panel when a display apparatus according to the present invention displays a three-dimensional image.

FIG. 5 is a plane view of the switching panel 30, and FIG. 6 is a plane view of an overlap of the flat panel display device 10 and the switching panel 30 when a display apparatus according to embodiments of the present invention displays a three-dimensional image.

The switching panel 30 has a structure which transmits light as it is when two-dimensional image display is requested and corresponds to pixel information of the flat panel display device 10 when three-dimensional image display is requested. In other words, each pixel of the switching panel 30 includes a valid image display region 31 which transmits light during three-dimensional image display and a selective blocking region 33 surrounding the valid image display region 31. Preferably, but not necessarily, the valid image display region 31 can be adjusted when necessary.

The selective blocking region 33 is turned on or off according to a type of image generated by the flat panel display device 10 such that it transmits light during two-dimensional image display and blocks light during three-dimensional image display. Meanwhile, the valid image display region 31 is always set to a mode in which it transmits light.

The switching panel 30 may include an LCD panel to operate in a matrix structure so that light can be selectively turned on or off according to a control signal. The switching panel 30 may be implemented by a super twisted nematic (STN) LCD panel or a thin film transistor (TFT) LCD panel. An LCD panel used as the switching panel 30 does not need to display colors.

The switching panel 30 may have the same pixel structure as the flat panel display device 10. For example, when an LCD panel is used as the flat panel display device 10, an LCD panel which is the same as that used as the flat panel display device 10 with the exception that it does not include a color filter may be used as the switching panel 30. When an LCD panel is used as the switching panel 30, a size of the valid image display region 31 is easy to adjust according to occasion.

When the switching panel 30 is designed to operate in a normally white mode in which light is blocked when power is supplied, a driving electric field does not need to be applied to the valid image display region 31 which always transmits light and is selectively applied only to the selective blocking region 33. When the driving electric field is applied to the selective blocking region 33, the selective blocking region 33 is turned on and blocks light. When the driving electric field is not applied to the selective blocking region 33, the selective blocking region 33 is turned off and transmits light. As a result, transmission of light can be selectively controlled to be on or off.

Accordingly, the switching panel 30 forms a parallax barrier having a grid structure, as shown in FIG. 6, only during three-dimensional image display. FIG. 6 shows a state in which the parallax barrier is formed when the selective blocking region 33 of the switching panel 30 operates to block light. In FIGS. 5 and 6, the selective blocking region 33 is exaggerated.

When a parallax barrier is formed using the switching panel 30 while the flat panel display device 10 generates a plurality of viewpoint images having parallax to be arranged in the n×n matrix in each pixel, a visual field is formed due to a width $Ep_i$ of the valid image display region 31, i.e., a bright portion transmitting light in FIG. 6, surrounded by the selective blocking region 33 and a distance ("d" of FIG. 8) between the switching panel 30 and the flat panel display device 10 so that a multiple viewpoint three-dimensional image can be viewed.

In FIG. 6, reference numeral 15 denotes a point light source with respect to the switching panel 30. Point light sources 15 mean viewpoint images having the same viewpoint in the pixels of the flat panel display device 10. In FIG. 6, the point light sources 15 are not located at the same positions in the respective pixels because the position of a point light source 15 is changed according to a position from which the point light source 15 is viewed.

As shown in FIG. 6, unlike the conventional display apparatus in which a point light source is formed by a lens unit, in the display apparatus according to the present invention, the point light sources 15 are formed by the switching panel 30. Accordingly, in the display apparatus according to the present invention, a visual field is formed by the switching panel 30.

The visual field expansion unit 50 expands a visual field in a horizontal direction and/or a vertical direction. In the embodiment shown in FIG. 3, the visual field expansion unit 50 includes a first lens plate 51 which expands the visual field in the horizontal direction and a second lens plate 55 which expands the visual field in the vertical direction. The first lens plate 51 includes a plurality of lenticules arranged in the horizontal direction, and the second lens plate 55 includes a plurality of lenticules arranged in the vertical direction. A structure of the visual field expansion unit 50 can be varied.

Figure 7:
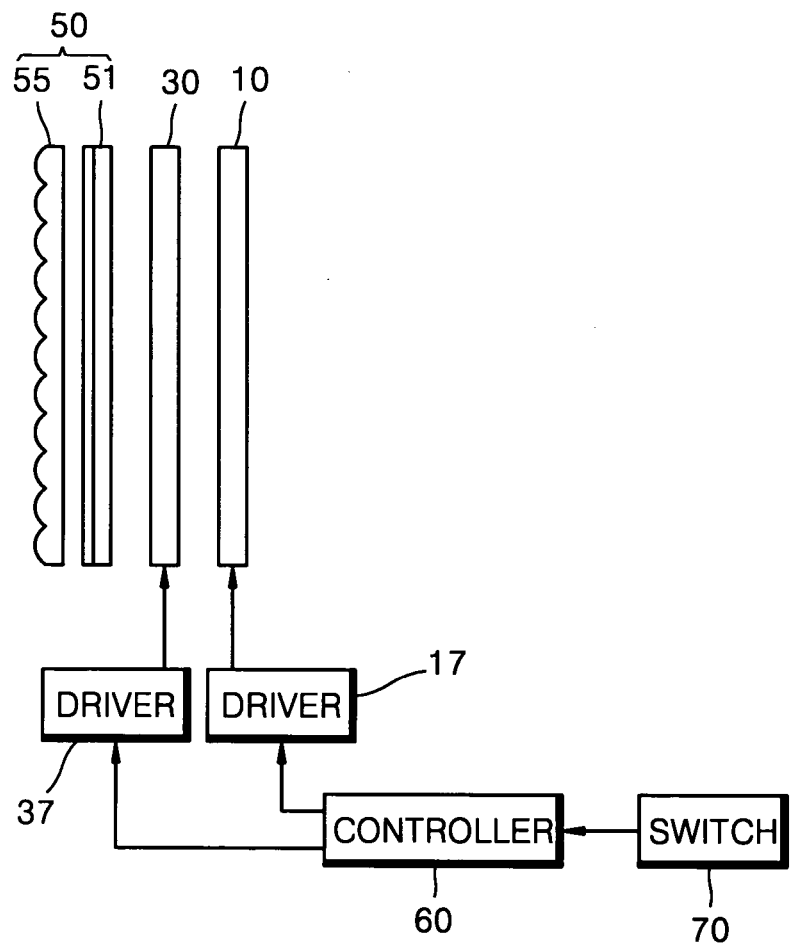
FIG. 7 is a schematic diagram of an entire structure of a display apparatus according to the present invention.

FIG. 7 is a schematic diagram of an entire structure of a display apparatus according to an illustrative embodiment of the present invention. Referring to FIG. 7, the display apparatus including the switching panel 30 can selectively display a two-dimensional image and a three-dimensional image according to a user's operation of a switch 70. In other words, when the user simply operates the switch 70, a two-dimensional image and a three-dimensional image can be selectively displayed. In response to the user's operation of the switch 70, a controller controls drivers 17 and 37. In response to driving signals of the respective drivers 17 and 37, the flat panel display device 10 and the switching panel 30 operate to display a two-dimensional image or a three-dimensional image.

For example, when a two-dimensional image display mode is selected by a user operating the switch 70, the flat panel display device 10 generates two-dimensional images, and simultaneously, the switching panel 30 is controlled to be suitable to a type of image generated by the flat panel display device 10 and thus transmit light as it is. With such an operation, the display apparatus according to the present invention displays two-dimensional images.

When a three-dimensional display mode is selected by the user operating the switch 70, the flat panel display device 10 generates a plurality of viewpoint images having parallax in each pixel to accomplish three-dimensional image display, and simultaneously, the switching panel 30 is controlled to be suitable to a type of image generated by the flat panel display device 10 and thus forms a parallax barrier in a grid structure corresponding to pixel information of the flat panel display device 10. As a result, a visual field is formed, and a three-dimensional image is displayed. The visual field expansion unit 50 expands the visual field formed by the switching panel 30 in a horizontal direction and/or a vertical direction.

As described above, a display apparatus according to the present invention can selectively display a two-dimensional image and a three-dimensional image according to a user's selection.

A display apparatus having the above-described structure according to the present invention can be designed to implement an optimal three-dimensional image system as will be described below.

Figure 8:
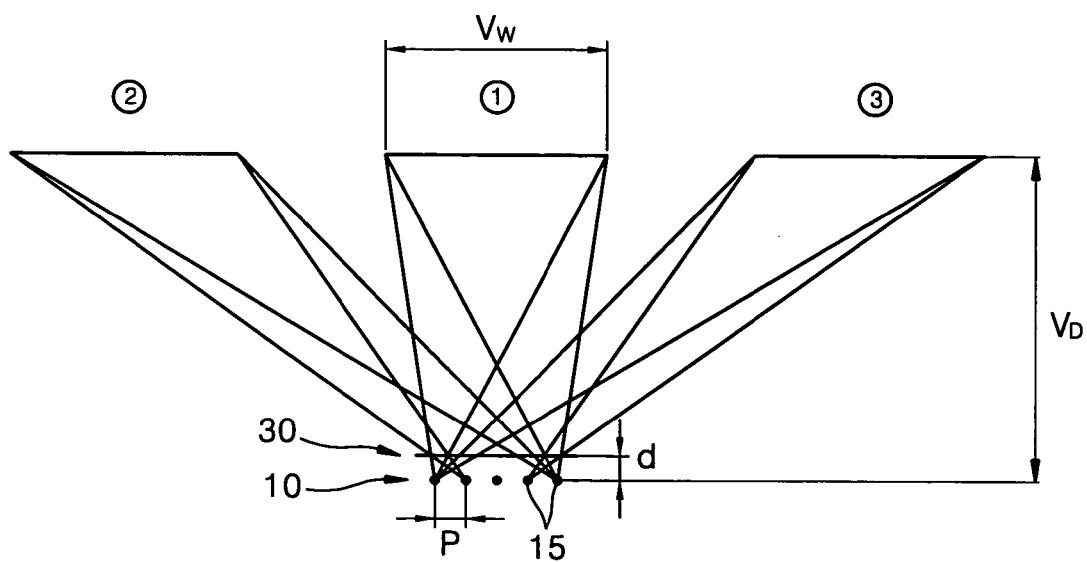
FIG. 8 illustrates a principle of forming a visual field when a display apparatus according to the present invention displays a three-dimensional image.

As described above, FIG. 6 shows a state in which the flat panel display device 10 generates 25 viewpoint images arranged in a 5×5 matrix in each pixel, and the selective blocking areas 33 of the switching panel 30 are operated to form a parallax barrier in a grid structure so as to display a three-dimensional image using the 25 viewpoint images. FIG. 8 illustrates a principle of forming a visual field when a display apparatus according to embodiments of the present invention displays a three-dimensional image.

When n×n viewpoint images having different parallaxes are arranged in each pixel on the flat panel display device 10 and a parallax barrier is formed to correspond to a structure of a viewpoint image arrangement using the switching panel 30, multiple viewpoint three-dimensional images are formed at positions ①, ②, and ③, respectively, due to effects of a size of each valid image display region 31 on the switching panel 30 and the distance "d" between the switching panel 30 and the flat panel display device 10, as shown in FIG. 8.

In practical use, since the display apparatus is housed in a case, a viewer can watch the three-dimensional image formed at the position ①, and the three-dimensional images formed at the positions ② and ③ are not shown to the viewer. When a normal two-dimensional image is displayed, for example, no electric field is applied to the switching panel 30 so that the switching panel 30 transmits light from the flat panel display device 10 as it is. As a result, the normal two-dimensional image is shown at the position ①.

In FIGS. 6 and 8, when a pixel pitch, i.e., a pitch of the point light sources 15, on the flat panel display device 10 is denoted by "p", a pixel pitch on the switching panel 30 is denoted by $p_i$, a watching distance is denoted by $V_D$, and a distance between the flat panel display device 10 and the switching panel 30 is denoted by "d", a relationship therebetween is defined by Formula (1).

$$p_i = p\left(1 - \frac{d}{V_D}\right) \quad (1)$$

When a width of each bright region, i.e., each valid image display region 31 transmitting light, other than the selective blocking regions 33 on the switching panel 30 is denoted by $Ep_i$, and a width of a whole visual field of the three-dimensional image formed at the position ① is denoted by $V_W$, a relationship therebetween is defined by Formula (2).

$$Ep_i = V_W \cdot \frac{d}{V_D} \quad (2)$$

Here, a shape or a position of $Ep_i$ varies with a shape or a position of a visual field of each viewpoint.

When the width $Ep_i$ of the valid image display region 31 is greater than the pixel pitch $p_i$, in the visual field of one viewpoint, an image of the one viewpoint overlaps an image of another viewpoint. Accordingly, it is preferable, but not necessary, that a relationship between the width $Ep_i$ and the pixel pitch $p_i$ satisfies Formula (3).

$$Ep_i \leq p_i \quad (3)$$

It is also preferable, but not necessary, to minimize a difference between the width $Ep_i$ and the pixel pitch $p_i$. Minimizing the difference between the width $Ep_i$ and the pixel pitch $p_i$ means that the width $Ep_i$ of the valid image display region 31 transmitting light in each pixel on the switching panel 30 is maximized.

In order to minimize the difference between the width $Ep_i$ and the pixel pitch $p_i$, it is preferable, but not necessary, to maximize the distance between the flat panel display device 10 and the switching panel 30, i.e., a distance "d" between each point light source 15 and the parallax barrier. A maximum value of the distance "d" between the flat panel display device 10 and the switching panel 30 is given by a distance between a row of the point light sources 15 and a line connecting intersects among lines from adjacent point light sources 15 to the positions ①, ②, and ③, as shown in FIG. 8.

FIG. 8 shows a visual field when the flat panel display device 10 and the switching panel 30 are disposed to minimize the difference between the width $Ep_i$ and the pixel pitch $p_i$.

As described above, when the switching panel 30 is disposed such that a row of pixels on the switching panel 30 is positioned on the line connecting the intersects, a horizontal width of the valid image display regions 31 is the same as that of the pixels of the switching panel 30. When a visual field is a rectangle or a square, the valid image display regions 31 are completely the same as the pixels on the switching panel 30. Accordingly, an image of high picture quality can be displayed.

Since the width $Ep_i$ cannot be greater than the pixel pitch $p_i$, as shown in Formula (3), and the pixel pitch $p_i$ cannot be greater than the pitch "p" of the point light sources 15, as shown in Formula (1), the width $Ep_i$ is less than the pitch "p" of the point light sources 15. When the pitch "p" of the point light sources 15 is constant, the distance "d" maximizing the width $Ep_i$ needs to be decreased in order to increase the width $V_W$ of the visual field. Accordingly, it is possible to increase a viewing angle by disposing an image display mask, i.e., the switching panel 30, near an array of the point light sources 15 to increase the width $V_W$ of the visual field. When a width of a visual field increases, a width of a visual field of each viewpoint also increases. Even when the distance "d" is decreased, an illumination angle of each point light source 15 must be wide enough to illuminate a corresponding valid image display region 31.

When the distance $V_D$ between the visual field and the array of the point light sources 15 and the width $V_W$ of the visual field are increased together, the width $V_W$ can be increased, but a viewing angle does not change.

A visual field of each viewpoint within the visual field is a micro region formed by light collected from viewpoint pixels, having the same viewpoint in the respective pixels. Thus, fundamentally, the whole visual field is sectionalized into visual fields of different viewpoints, and the whole visual field is not continuous. When a distance between adjacent visual fields of different viewpoints is denoted by $\Delta V$, an image width $\Delta Ep_i$ corresponding to the distance $\Delta V$ in each valid image display region 31 is given by Formula (4).

$$\Delta Ep_i = \Delta V \cdot \frac{d}{V_D} \quad (4)$$

As is seen from Formula (4), when $\Delta V$ increases, $\Delta Ep_i$ also increases. As a result, the number of viewpoint images which can be displayed is restricted, but a size of a visual field of each viewpoint within the whole visual field ($V_W$) increases in proportion to a magnitude of $\Delta Ep_i$. An area corresponding to each viewpoint pixel in each valid image display region 31 is increased when $\Delta V$ increases. In contrast, when $\Delta V$ decreases, the area corresponding to each viewpoint pixel in each valid image display region 31 is decreased to have a pin hole shape.

As described above, $\Delta V$ indicates a size of a visual field of each viewpoint. Accordingly, when $\Delta Ep_i$ increases, the size of the visual field of each viewpoint also increases, but the number of multiple viewpoint images which can be displayed is decreased.

A display apparatus having the above-described structure according to the present invention can be designed to optimally display three-dimensional images by controlling parameters such as the number of viewpoints of a three-dimensional image, a size of a visual field, and a viewpoint distance using Formula (1), Formula (2), Formula (3), and/or Formula (4).

Technology of designing a display apparatus of the present invention can be used to optimally design a three-dimensional image system using a pin hole or a microlens. Accordingly, the present invention can contribute to improving functions of display apparatuses manufactured at present.

In addition, a display apparatus of the present invention can be used in various fields requiring three-dimensional image display. For example, when a display apparatus of the present invention is used for advertisement display, display of realistic cubic images can enhance an advertising effect. In addition, since simulations such as computer-aided design (CAD) and computer-aided manufacturing (CAM) can be operated in a three-dimensional space, the present invention is suitable for educational displays. The present invention is also suitable for military displays, for example, simulations for military operations or various new navigation apparatuses. In addition, the present invention is suitable for medical displays such as used for accurate diagnosis during endoscopic surgeries.

According to a display apparatus of the present invention, three-dimensional images can be naturally displayed, and a normal two-dimensional image and a three-dimensional image having a depth can be selectively displayed according to a type of content when necessary. In other words, according to the present invention, horizontal and vertical parallax is made so that a viewer can watch three-dimensional images from any positions. Since the number of images can be increased, fatigue of the eyes can be remarkably decreased, and a viewer can watch natural three-dimensional images. A two-dimensional image and a three-dimensional image can be selectively displayed when a user simply controls a switch.

Unlike conventional display apparatuses which are expensive and are not suitable for market and thus have low practical usability, a display apparatus of the present invention can selectively display a two-dimensional image and a three-dimensional image, thereby having high practical usability.

What is claimed is:

1. A display apparatus for selectively displaying a two-dimensional image and a three-dimensional image, the display apparatus comprising:
   a flat panel display device which generates a two-dimensional image when two-dimensional image display is requested and generates a plurality of viewpoint images having parallax when three-dimensional image display is requested; and
   a switching panel which is disposed in front of the flat panel display device to be separated from the flat panel display device by a predetermined distance and is controlled according to a type of image generated by the flat panel display device so that the two-dimensional image and the three-dimensional image can be displayed,
   wherein at least one of following formulae is satisfied:

$$p_i = p\left(1 - \frac{d}{V_D}\right) \text{ and }$$

$$Ep_i = V_W \cdot \frac{d}{V_D},$$

where "p" denotes a pixel pitch of the flat panel display device, $p_i$ denotes a pixel pitch of the switching panel, $V_D$ denotes a watching distance, "d" denotes a distance between the flat panel display device and the switching panel, $Ep_i$ denotes a width of the valid image display region transmitting light on the switching panel during three-dimensional image display, and $V_w$ denotes a width of a visual field.

2. The display apparatus of claim 1, wherein the switching panel is formed to transmit light as it is when the two-dimensional image is generated by the flat panel display device and has a structure corresponding to pixel information of the flat panel display device when a plurality of viewpoint images for forming the three-dimensional image are generated by the flat panel display device.

3. The display apparatus of claim 2, wherein each pixel of the switching panel comprises:
   a valid image display region which transmits light corresponding to the viewpoint images during the three-dimensional image display; and
   a selective blocking region which surrounds the valid image display region and selectively transmits and blocks light according to an on/off control.

4. The display apparatus of claim 3, wherein a size of the valid image display region can be adjusted.

5. The display apparatus of claim 4, wherein the switching panel is a liquid crystal display which is designed to selectively turn on and off light according to a control signal.

6. The display apparatus of claim 3, wherein the switching panel is a liquid crystal display which is designed to selectively turn on and off light according to a control signal.

7. The display apparatus of claim 2, wherein the switching panel is a liquid crystal display which is designed to selectively turn on and off light according to a control signal.

8. The display apparatus of claim 1, wherein the flat panel display device is one selected from the group consisting of a liquid crystal display, a plasma display panel, a field emission device, and an organic electroluminescence panel.

9. The display apparatus of claim 1, wherein the flat panel display device generates a plurality of viewpoint images arranged in an n×n matrix in each pixel when the three-dimensional image is generated.

10. The display apparatus of claim 1, wherein the width $E_{pi}$ of the valid image display region transmitting light on the switching panel and the pixel pitch $P_i$ of the switching panel satisfy a relationship expressed by $Ep_i \leq P_i$.

11. The display apparatus of claim 1, wherein when a distance between adjacent visual fields of different viewpoints is denoted by $\Delta V$, an image width $\Delta E_i$ corresponding to the distance $\Delta V$ in the valid image display region is given by a following formula:

$$\Delta Ep_i = \Delta V \cdot \frac{d}{V_D}.$$

12. The display apparatus of claim 1, further comprising a visual field expansion unit which expands a visual field in at least one of a vertical direction and a horizontal direction.

13. The display apparatus of claim 12, wherein the visual field expansion unit comprises a first lens plate which expands the visual field in the horizontal direction and a second lens plate which expands the visual field in the vertical direction.

14. The display apparatus according to claim 1, wherein the switching panel forms a parallax baffler having a grid structure when the three-dimensional image display is requested.

15. The display apparatus according to claim 8, wherein the flat panel display device is configured to display the viewpoint images having parallax in a horizontal direction, a vertical direction and a diagonal direction.

* * * * *